United States Patent
Chen et al.

(10) Patent No.: US 10,977,026 B2
(45) Date of Patent: Apr. 13, 2021

(54) DATA UPDATING SYSTEM, EMBEDDED ELECTRONIC DEVICE AND DATA UPDATING METHOD

(71) Applicant: PEGATRON CORPORATION, Taipei (TW)

(72) Inventors: Wei-Ling Chen, Taipei (TW); Po-Han Lin, Taipei (TW)

(73) Assignee: PEGATRON CORPORATION, Taipei (TW)

(*) Notice: Subject to any disclaimer, the term of this patent is extended or adjusted under 35 U.S.C. 154(b) by 0 days.

(21) Appl. No.: 16/673,690

(22) Filed: Nov. 4, 2019

(65) Prior Publication Data
US 2020/0159519 A1    May 21, 2020

(30) Foreign Application Priority Data
Nov. 20, 2018 (TW) .............................. 107141209 A

(51) Int. Cl.
*G06F 8/65* (2018.01)
*G06F 13/16* (2006.01)
*G06F 13/42* (2006.01)

(52) U.S. Cl.
CPC ............ *G06F 8/65* (2013.01); *G06F 13/1668* (2013.01); *G06F 13/4282* (2013.01)

(58) Field of Classification Search
USPC ........................................................ 717/170
See application file for complete search history.

(56) References Cited

U.S. PATENT DOCUMENTS 6,675,023 B1   1/2004  Tamukai
7,089,549 B2 *  8/2006  Venkiteswaran ..... G06F 9/4408
                                                                717/170
(Continued)

FOREIGN PATENT DOCUMENTS

CN   101997956   3/2011
CN   107656513   2/2018
(Continued)

OTHER PUBLICATIONS

Microsoft, "Advanced startup options (including safe mode)," accessed Oct. 2019, Available at: https://support.microsoft.com/en-us/help/17419/windows-7-advanced-startup-options-safe-mode.

*Primary Examiner* — Qing Chen
*Assistant Examiner* — Clint Thatcher
(74) *Attorney, Agent, or Firm* — J.C. Patents

(57) ABSTRACT

A data updating system, an embedded electronic device and a data updating method are provided. The data updating system includes the embedded electronic device and an auxiliary updating device. The embedded electronic device has a serial transmission port. The auxiliary updating device is coupled to the serial transmission port of the embedded electronic device. The embedded electronic device in a normal mode transmits a periodic signal to the auxiliary updating device through the serial transmission port, and the auxiliary updating device transmits status information to the embedded electronic device according to the periodic signal. If the status information is mode switching information, the embedded electronic device enters a special mode, and the embedded electronic device in the special mode receives update data from the auxiliary updating device through the serial transmission port to update internal data of the embedded electronic device.

11 Claims, 6 Drawing Sheets

(56) References Cited

U.S. PATENT DOCUMENTS

| | | | |
|---|---|---|---|
| 2003/0061603 A1* | 3/2003 | Tang | G06F 8/65 |
| | | | 717/168 |
| 2006/0075276 A1 | 4/2006 | Kataria et al. | |
| 2010/0325622 A1* | 12/2010 | Morton | G06F 8/654 |
| | | | 717/168 |
| 2012/0005665 A1* | 1/2012 | Repellin | G06F 8/65 |
| | | | 717/168 |
| 2018/0225230 A1* | 8/2018 | Litichever | G06F 21/82 |
| 2019/0258472 A1* | 8/2019 | Kim | G06F 8/65 |
| 2020/0026682 A1* | 1/2020 | Thomas | G06F 9/44505 |
| 2020/0150976 A1* | 5/2020 | Lee | G06F 1/266 |

FOREIGN PATENT DOCUMENTS

| | | | | |
|---|---|---|---|---|
| EP | 2065717 B1 * | 7/2008 | | G06F 11/273 |
| TW | 201027944 | 7/2010 | | |

* cited by examiner

DATA UPDATING SYSTEM, EMBEDDED ELECTRONIC DEVICE AND DATA UPDATING METHOD

CROSS-REFERENCE TO RELATED APPLICATION

This application claims the priority benefit of Taiwan application serial no. 107141209, filed on Nov. 20, 2018. The entirety of the above-mentioned patent application is hereby incorporated by reference herein and made a part of this specification.

BACKGROUND

Technology Field

The disclosure relates to a data updating technology, and in particular to a data updating system, an embedded electronic device and a data updating method for updating internal data of the embedded electronic device.

Description of Related Art

Generally, an embedded electronic device does not have a user interface such as a keyboard, a mouse, or a screen. Therefore, in a development and design phase of the embedded electronic device, a designer usually needs to design a special reference board and to adopt an In-Circuit Emulator (ICE), so as to perform debug on the embedded electronic device or update a software or a firmware of the embedded electronic device. However, the special reference board is not the production version, and the ICE interface would not exist in the production version of the embedded electronic device. Once the designer wishes to modify the software or the firmware of the production version of the embedded electronic device, the designer may have to update the software or the firmware of the embedded electronic device via an Over-the-Air (OTA) technology, using a wireless communication module of the embedded electronic device. However, in a situation in which the wireless communication function of the embedded electronic device is not able to function normally or has not yet been developed, the update of the software or the firmware of the embedded electronic device would be extremely difficult.

SUMMARY

In view of the issues mentioned above, the disclosure provides a data updating system, an embedded electronic device and a data updating method that may update internal data of an embedded electronic device through an auxiliary updating device to reduce difficulty of updating the data of the embedded electronic device.

A data updating system of the disclosure includes an embedded electronic device and an auxiliary updating device. When the auxiliary updating device receives a periodic signal, the auxiliary updating device transmits status information. The embedded electronic device has a serial transmission port coupled to the auxiliary updating device. The embedded electronic device in a normal mode transmits the periodic signal to the auxiliary updating device through the serial transmission port to obtain the status information. If the status information is mode switching information, the embedded electronic device enters a special mode, and the embedded electronic device in the special mode receives update data from the auxiliary updating device through the serial transmission port to update internal data of the embedded electronic device.

An embedded electronic device of the disclosure includes a serial transmission port, a storage, and a processing circuit. The serial transmission port is configured to couple an auxiliary updating device. The storage is configured to store internal data of the embedded electronic device. The processing circuit is coupled to the serial transmission port and the storage. The processing circuit transmits a periodic signal to the auxiliary updating device through the serial transmission port to obtain status information when the embedded electronic device operates in a normal mode. If the status information is mode switching information, the processing circuit controls the embedded electronic device to enter a special mode. The processing circuit the embedded electronic device in the special mode receives update data from the auxiliary updating device through the serial transmission port to update the internal data stored in the storage.

A data updating method of the disclosure includes following steps. When operating in a normal mode, a periodic signal is transmitted to an auxiliary updating device by the embedded electronic device through a serial transmission port of the embedded electronic device to obtain status information. If the status information is mode switching information, the embedded electronic device enters a special mode. When operating in the special mode, update data is received by the embedded electronic device from the auxiliary updating device through the serial transmission port to update internal data of the embedded electronic device.

Based on the above, the data updating system, embedded electronic device and data updating method provided by the disclosure may update the internal data of the embedded electronic device by the auxiliary updating device to reduce the difficulty of updating the data of the embedded electronic device.

In order to make the features and advantages of the disclosure mentioned above more understandable, embodiments will be described in detail below with reference to the accompanying drawings.

BRIEF DESCRIPTION OF THE DRAWINGS

The accompany drawings below are a part of the specification of the disclosure, showing example embodiments of the disclosure. The description of the accompany drawings and the specification, together, explain principles of the disclosure.

DETAILED DESCRIPTION

Figure 1:
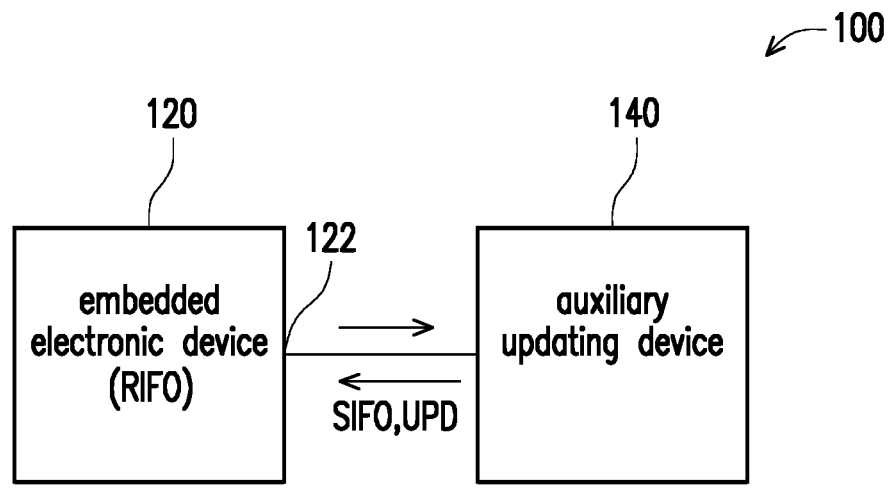
FIG. 1 is a schematic diagram of a data updating system according to an embodiment of the disclosure.

To make the content of the disclosure more easily understandable, embodiments are raised as follows as examples of the disclosure than may certainly be implemented accordingly. In addition, wherever possible, elements/components/steps that use same reference numerals in drawings and implementing methods represent same or similar parts.

Please refer to FIG. 1, FIG. 1 is a schematic diagram of a data updating system according to an embodiment of the disclosure. A data updating system 100 includes an embedded electronic device 120 and an auxiliary updating device 140, wherein the auxiliary updating device 140 is not an In-Circuit Emulator (ICE). The embedded electronic device 120 has a serial transmission port 122. The auxiliary updating device 140 is (directly) coupled to the serial transmission port 122 of the embedded electronic device 120. The embedded electronic device 120 may transmit a periodic signal to the auxiliary updating device 140 through the serial transmission port 122 to obtain status information SIFO when operating in a normal mode. In an embodiment of the disclosure, a behavior that the embedded electronic device 120 transmits the periodic signal to the auxiliary updating device 140 is called poll. In other words, the embedded electronic device 120 polls a status of the auxiliary updating device 140. If the status information SIFO is mode switching information RIFO, the embedded electronic device 120 enters a special mode. In the special mode, the embedded electronic device 120 may receive update data UPD from the auxiliary updating device 140 through the serial transmission port 122 to update internal data of the embedded electronic device 120. Therefore, in a situation in which a wireless update function of the embedded electronic device 120 has not yet been developed or is unable to function normally, the internal data of the embedded electronic device 120 may still be updated by the auxiliary updating device 140 through the serial transmission port 122 of the embedded electronic device 120 even without an assistance of the ICE. Therefore, a difficulty of updating the data of the embedded electronic device 120 may be effectively overcome.

In an embodiment of the disclosure, the embedded electronic device 120 may poll the status of the auxiliary updating device 140 periodically, wherein the period may be set according to a practical application or a design requirement.

In an embodiment of the disclosure, if a designer wishes to update the internal data of the embedded electronic device 120, the designer may set the status of the auxiliary updating device 140 as a specific status, such that the status information SIFO obtained by the embedded electronic device 120 is mode switching information RIFO.

In an embodiment of the disclosure, the embedded electronic device 120 may be, for example, a control device plugged to an electrical products (such as an air conditioner), but the disclosure is not limited hereto. The disclosure does not limit a type of the embedded electronic device 120.

In an embodiment of the disclosure, the serial transmission port 122 may be, for example, a Universal Asynchronous Receiver/Transmitter (UART) port, a Serial Peripheral Interface (SPI) port, an Inter-Integrated Circuit (I²C) interface port, a System Management Bus (SMBus) port or other similar serial ports.

In an embodiment of the disclosure, in addition to updating the internal data of the embedded electronic device 120, the auxiliary updating device 140 may also be used as a simulated test device for the embedded electronic device 120 in the normal mode to test the function of the embedded electronic device 120.

In an embodiment of the disclosure, the auxiliary updating device 140 may be, for example, a personal computer (PC), a notebook computer (NB), a workstation and so on, but the disclosure is not limited hereto.

Figure 2:
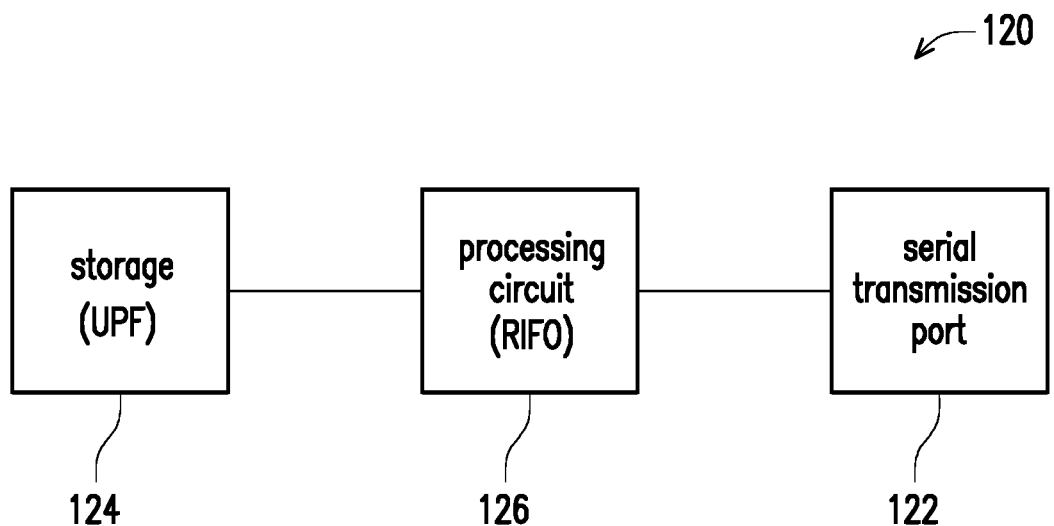
FIG. 2 is a circuit block schematic view of an embedded electronic device according to an embodiment of the disclosure.

Please refer to FIG. 1 and FIG. 2 together. FIG. 2 is a circuitry block diagram of an embedded electronic device according to an embodiment of the disclosure. The embedded electronic device 120 may include a serial transmission port 122, a storage 124, and a processing circuit 126, but the disclosure is not limited hereto. The serial transmission port 122 is configured to couple other electronic devices with the embedded electronic device 120 and serves as a signal transmission interface between the embedded electronic device 120 and the other electronic devices. In the present embodiment, the serial transmission port 122 is configured to couple the auxiliary updating device 140 with the embedded electronic device 120. The storage 124 is configured to store internal data of the embedded electronic device 120, wherein the internal data may be, for example, a software or a firmware required for the function of the embedded electronic device 120, but the disclosure is not limited hereto.

The processing circuit 126 is coupled to the serial transmission port 122 and the storage 124. The processing circuit 126 polls a status of the auxiliary updating device 140 through the serial transmission port 122 to obtain status information SIFO when the embedded electronic device 120 operates in a normal mode. Specifically, if the status information SIFO received by the processing circuit 126 is mode switching information RIFO, it means that the designer wishes to update the embedded electronic device 120, and the processing circuit 126 controls the embedded electronic device 120 to enter a special mode. The processing circuit 126 would receive update data UPD from the auxiliary updating device 140 through the serial transmission port 122 to update the internal data stored in the storage 124 when the embedded electronic device 120 operates in the special mode.

In an embodiment of the disclosure, the storage 124 may be, for example, a flash memory, a hard disc, or other similar elements, or a combination thereof, but the which is not limited hereto in the disclosure.

In an embodiment of the disclosure, the processing circuit 126 may be, for example, a Central Processing Unit (CPU) or other programmable Microprocessors for general or special purposes, Digital Signal Processors (DSP), programmable controllers, Application Specific Integrated Circuits (ASIC), or other similar elements or a combination thereof, but the disclosure is not limited hereto.

In an embodiment of the disclosure, the embedded electronic device 120 may further include a wireless communication module (not drawn). The wireless communication module is coupled to the processing circuit 126. In a situation in which the wireless communication module may function normally, the processing circuit 126 may perform communication with other devices through the wireless communication module. Specifically, the processing circuit 126 may execute wireless update by downloading update data from a cloud server through the wireless communication module. The wireless communication module may be, for example, a blue tooth module, a Wi-Fi module, a global system for mobile communication (GSM) module, a code division multiple access (CDMA) module, a wideband CDMA (WCDMA) module, a CDMA-2000 module, a time division multiple access (TDMA) module, a worldwide interoperability for microwave access (WiMAX) module, a long term evolution (LTE) module, a wireless local area network (WLAN) module, a Ultra-Wideband (UWB) module, or a combination thereof, but the disclosure is not limited hereto.

Figure 3:
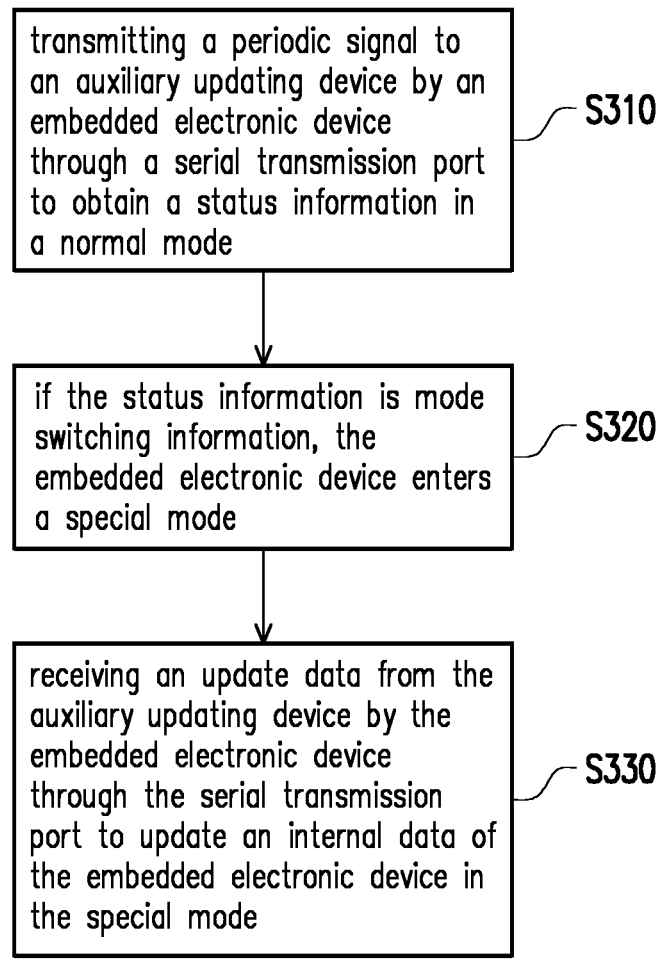
FIG. 3 is a flowchart of a data updating method according to an embodiment of the disclosure.
Figure 4:
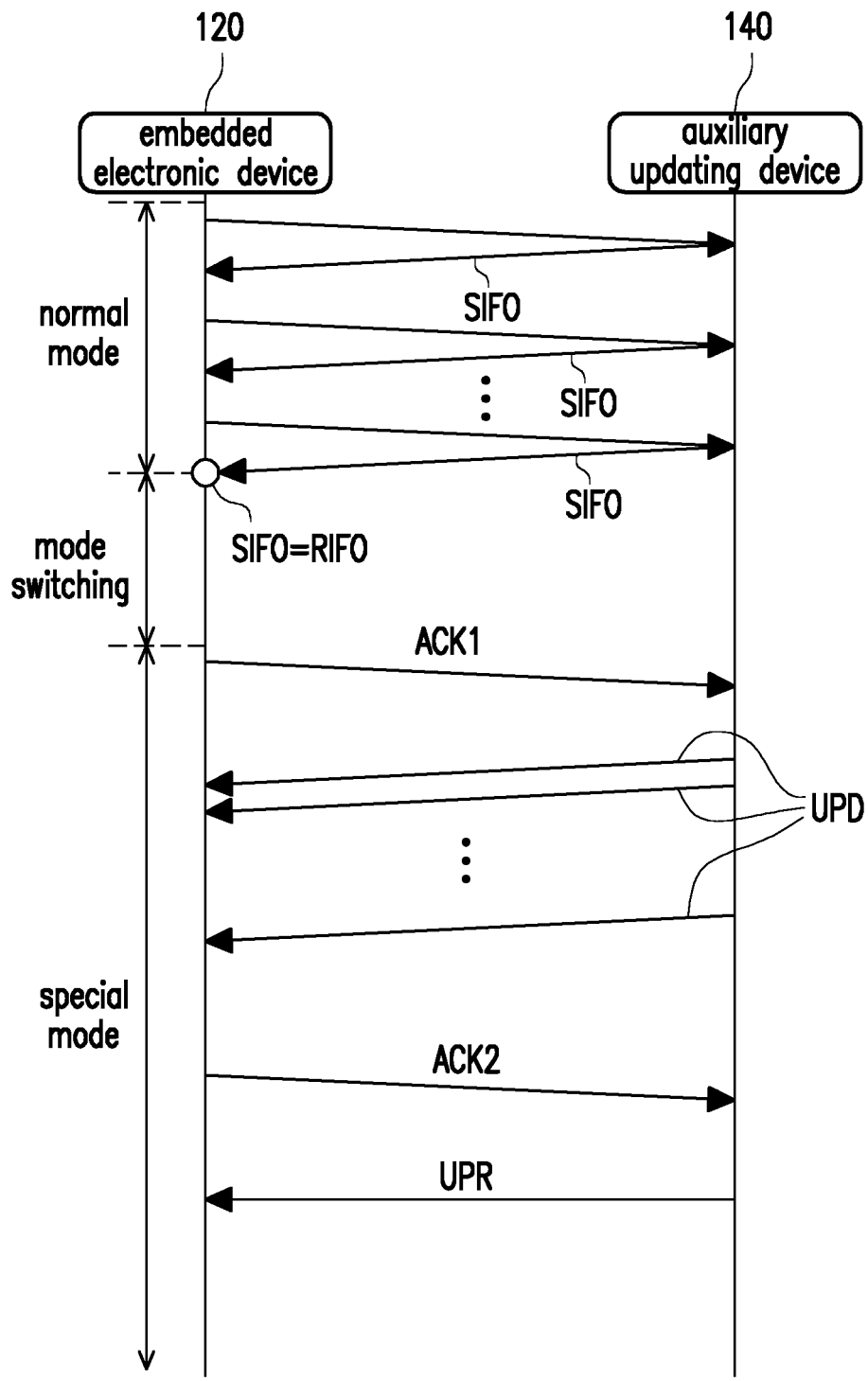
FIG. 4 is a signal sequence diagram between the embedded electronic device and the auxiliary updating device according to an embodiment of the disclosure.

Please refer to FIG. 1-FIG. 4 together. FIG. 3 is a flowchart of a data updating method according to an embodiment of the disclosure, which may be applied to the data updating system 100 of the FIG. 1. FIG. 4 is a signal sequence diagram between the embedded electronic device and the auxiliary updating device according to an embodiment of the disclosure, wherein the vertical axis of FIG. 4 represents time. Firstly, in the normal mode, a periodic signal is transmitted by the embedded electronic device 120 to the auxiliary updating device 140 through the serial transmission port 122 to obtain the status information SIFO as shown by a step S310 of FIG. 3 (or the normal mode in FIG. 4). If the status information SIFO is the mode switching information RIFO, the embedded electronic device 120 enters the special mode as shown by a step S320 of FIG. 3 (or the mode switching in FIG. 4). Afterward, in the special mode, the update data UPD is received by the embedded electronic device 120 from the auxiliary updating device 140 through the serial transmission port 122 to update the internal data of the embedded electronic device 120 as shown by a step S330 of FIG. 3 (or the special mode of FIG. 4).

Figure 5:
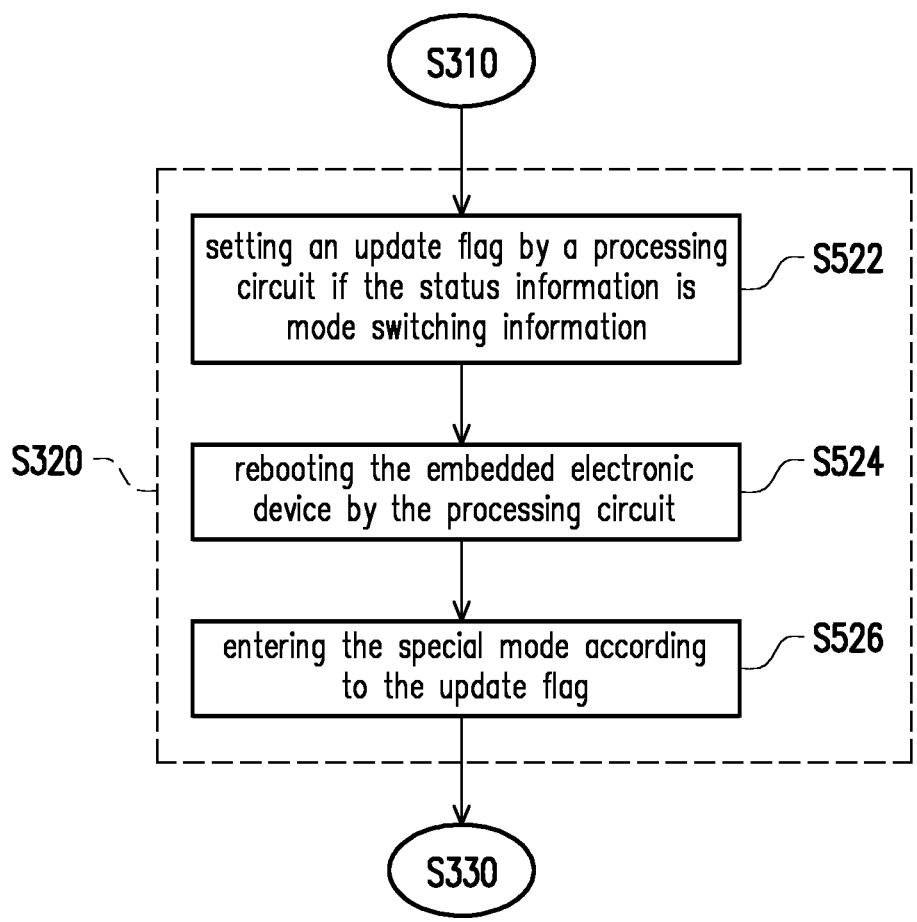
FIG. 5 is a flowchart of details of the step S320 according to an embodiment of the disclosure.

Details of the step S320, which is implementation descriptions of the mode switching of FIG. 4, are stated as follows. Please refer to FIG. 2 and FIG. 5 together. FIG. 5 is a flowchart of the details of the step S320 according to an embodiment of the disclosure. The step S320 includes steps S522, S524 and S526. Firstly, if the status information SIFO is the mode switching information RIFO, an update flag UPF is set by the processing circuit 126 as shown in the step S522. Preferably, the update flag UPF is stored in the storage 124 of the embedded electronic device 120. Further, in the step S524, the embedded electronic device 120 is rebooted by the processing circuit 126. Afterward, in the step S526, the embedded electronic device 120 controlled by the processing circuit 126 enters the special mode according to the update flag UPF.

Figure 6:
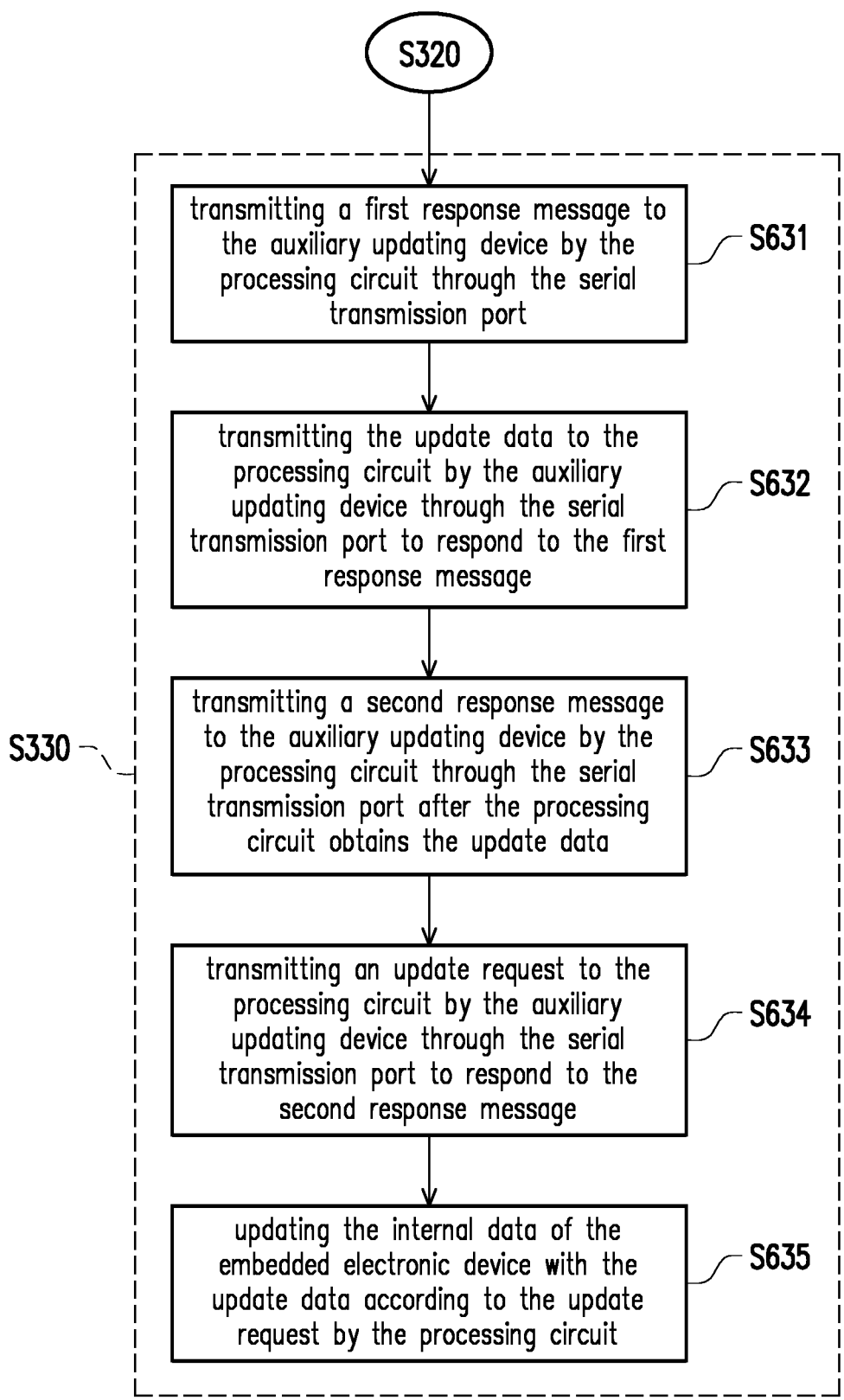
FIG. 6 is a flowchart of details of the step S330 according to an embodiment of the disclosure.

Details of the step S330, which are implementation descriptions of the special mode of FIG. 4, are stated as follows. Please refer to FIG. 2, FIG. 4 and FIG. 6 together. FIG. 6 is a flowchart of the details of the step S330 according to an embodiment of the disclosure. The step S330 includes steps S631-S635. Firstly, in the step S631, a first response message ACK1 is transmitted to the auxiliary updating device 140 by the processing circuit 126 through the serial transmission port 122. Further, in the step S632, the update data UPD is transmitted to the processing circuit 126 by the auxiliary updating device 140 through the serial transmission port 122 to respond to the first response message ACK1. Then, in the step S633, after the processing circuit 126 obtains the update data UPD, a second response message ACK2 is transmitted to the auxiliary updating device 140 by the processing circuit 126 through the serial transmission port 122. Further, in the step S634, an update request UPR is transmitted to the processing circuit 126 by the auxiliary updating device 140 through the serial transmission port 122 to respond to the second response message ACK2. Afterward, in the step S635, the internal data of the embedded electronic device 120 is updated by the processing circuit 126 with the update data UPD according to the update request UPR. After the internal data of the embedded electronic device 120 has been updated, the processing circuit 126 switches the embedded electronic device 120 from the special mode back to the normal mode.

Figure 7A:
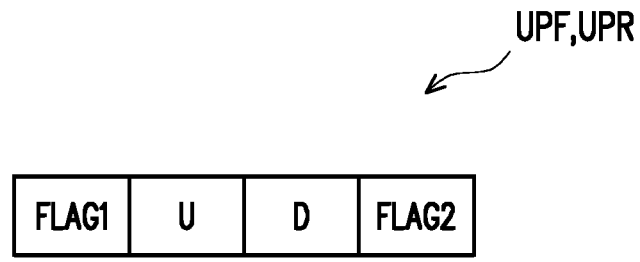
FIG. 7A is a format of an update flag and an update request according to an embodiment of the disclosure.

Please refer to FIG. 2, FIG. 4, and FIG. 7A together. FIG. 7A is a format of an update flag and an update request according to an embodiment of the disclosure. The update flag UPF and the update request UPR may include four bytes such as a head byte FLAG1, update information bytes U and D, and a tail byte FLAG2, but the disclosure is not limited hereto. The number of bytes possessed by the update flag UPF and the update request UPR of the disclosure may be decided according to a practical application or a design requirement. The update information bytes U and D are located between the head byte FLAG1 and the tail byte FLAG2. The head byte FLAG1 and the tail byte FLAG2 may be reserved for the identification for the processing circuit 126 of FIG. 2. The processing circuit 126 of FIG. 2 may identify the update request UPR according to the head byte FLAG1 and the tail byte FLAG2, and read the update information bytes U and D in the update request UPR, followed by determining that the embedded electronic device 120 is required to update data according to the update information bytes U and D. Thus, the processing circuit 126 may update the internal data of the embedded electronic device 120 with the update data UPD in response to the update information bytes U and D in the update request UPR. Or, if the status information SIFO is the mode switching information RIFO, the processing circuit 126 of FIG. 2 may set the update information bytes U and D in the update flag UPF (stored in the storage 124), and control the embedded electronic device 120 to enter the special mode according to the update information bytes U and D in the update flag UPF after the embedded electronic device 120 reboots.

Figure 7B:
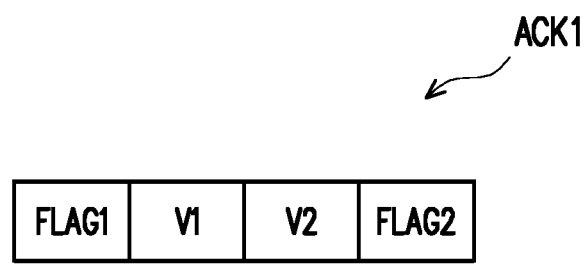
FIG. 7B is a format of a first response message according to an embodiment of the disclosure.

Please refer to FIG. 4 and FIG. 7B together. FIG. 7B is a format of a first response message according to an embodiment of the disclosure. A first response message ACK1 may include version information of the update data UPD required by the embedded electronic device 120. Specifically, the first response message ACK1 may include four bytes such as the head byte FLAG1, version information bytes V1 and V2, and the tail byte FLAG2, but the disclosure is not limited hereto. The number of the bytes possessed by the first response message ACK1 of the disclosure may be decided according to the practical application and the design requirement. The version information bytes V1 and V2 are located between the head byte FLAG1 and the tail byte FLAG2. The head byte FLAG1 and the tail byte FLAG2 may be reserved for the identification for the auxiliary updating device 140. The auxiliary updating device 140 may obtain the version information bytes V1 and V2 in the first message response ACK1 according to the head byte FLAG1 and the tail byte FLAG2. The auxiliary updating device 140 may determine the version information of the update data UPD required by the embedded electronic device 120 according to the version information bytes V1 and V2. Thus, the auxiliary updating device 140 may provide the update information UPD corresponding to the version information to the embedded electronic device 120.

In an embodiment of the disclosure, the version information byte V1 may be, for example, sales region information of the embedded electronic device 120, and the version information byte V2 may be, for example, hardware specification information of the processing circuit 126 of the embedded electronic device 120, wherein the hardware specification information of the processing circuit 126 may be, for example, a computing speed of the processing circuit 126, but the disclosure is not limited hereto.

Figure 7C:
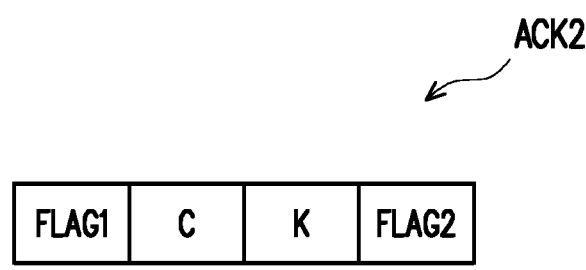
FIG. 7C is a format of a second response message according to an embodiment of the disclosure.

Please refer to FIG. 4 and FIG. 7C together. FIG. 7C is a format of a second response message according to an embodiment of the disclosure. The second response message ACK2 may include four bytes such as the head byte FLAG1, response information bytes C and K and the tail byte FLAG2, but the disclosure is not limited hereto. The number of the bytes possessed by the second response message ACK2 may be decided according to a practical application or a design requirement. The response information bytes C and K are located between the head byte FLAG1 and the tail byte FLAG2. The head byte FLAG1 and the tail byte FLAG2 may be reserved for the identification for the auxiliary updating device 140. The auxiliary updating device 140 may obtain the response message information bytes C and K in the second response message ACK2 according to the head byte FLAG1 and the tail byte FLAG2. The auxiliary updating device 140 may be aware that the embedded electronic device 120 has obtained the update data UPD according to the information bytes C and K. Therefore, the auxiliary updating device 140 may transmit the update request UPR to the embedded electronic device 120 to allow the embedded electronic device 120 to update the internal data thereof with the update data UPD.

Based on the above, the data updating system, the embedded electronic device and the data updating method provided by the embodiments of the disclosure may update the internal data of the embedded electronic device through the auxiliary updating device in the situation in which the wireless update function of the embedded electronic device cannot operate and no assistance of the In-Circuit Emulator (ICE) is provided, such that the difficulty of updating the data of the embedded electronic device could be overcome effectively.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data updating system comprising:
an auxiliary updating device configured to transmit status information when receiving a periodic signal; and
an embedded electronic device having a serial transmission port coupled to the auxiliary updating device, wherein the embedded electronic device in a normal mode transmits the periodic signal to the auxiliary updating device through the serial transmission port to obtain the status information, and if the status information is mode switching information, the embedded electronic device enters a special mode, and the embedded electronic device in the special mode receives update data from the auxiliary updating device through the serial transmission port to update internal data of the embedded electronic device.

2. The data updating system according to claim 1, wherein the embedded electronic device in the special mode transmits a first response message to the auxiliary updating device through the serial transmission port, and the auxiliary updating device transmits the update data to the embedded electronic device through the serial transmission port to respond to the first response message, wherein the first response message comprises version information of the update data.

3. The data updating system according to claim 2, wherein:
after obtaining the update data, the embedded electronic device transmits a second response message to the auxiliary updating device through the serial transmission port, the auxiliary updating device transmits an update request to the embedded electronic device through the serial transmission port to respond to the second response message, and the embedded electronic device updates the internal data of the embedded electronic device with the update data according to the update request.

4. The data updating system according to claim 1, wherein the auxiliary updating device is not an In-Circuit Emulator (ICE).

5. An embedded electronic device comprising:
a serial transmission port configured to couple an auxiliary updating device;
a storage configured to store internal data of the embedded electronic device; and
a processing circuit coupled to the serial transmission port and the storage, wherein the processing circuit transmits a periodic signal to the auxiliary updating device through the serial transmission port to obtain status information when the embedded electronic device operates in a normal mode, and if the status information is mode switching information, the processing circuit controls the embedded electronic device to enter a special mode, and the embedded electronic device in the special mode receives update data from the auxiliary updating device through the serial transmission port to update the internal data stored in the storage.

6. The embedded electronic device according to claim 5, wherein if the status information is the mode switching information, the processing circuit sets an update flag, reboots the embedded electronic device, and controls the embedded electronic device to enter the special mode according to the update flag.

7. The embedded electronic device according to claim 5, wherein when the embedded electronic device operates in the special mode, the processing circuit further transmits a first response message to the auxiliary updating device through the serial transmission port, wherein the first response message comprises version information of the update data.

8. The embedded electronic device according to claim 7, wherein after the processing circuit obtains the update data, the processing circuit transmits a second response message to the auxiliary updating device through the serial transmission port, receives an update request from the auxiliary updating device through the serial transmission port, and updates the internal data of the storage with the update data according to the update request.

9. A data updating method comprising following steps:
transmitting a periodic signal to an auxiliary updating device by the embedded electronic device through a serial transmission port of the embedded electronic device to obtain a status information when operating in a normal mode;
if the status information is mode switching information, the embedded electronic device enters a special mode; and receiving update data from the auxiliary updating device by the embedded electronic device through the serial transmission port to update internal data of the embedded electronic device when operating in the special mode.

10. The data updating method according to claim 9, wherein the step that the embedded electronic device enters the special mode comprises:

setting an update flag by a processing circuit of the embedded electronic device; and rebooting the embedded electronic device by the processing circuit; and controlling the embedded electronic device to enter the special mode according to the update flag by the processing circuit.

11. The data updating method according to claim 9, wherein the step of receiving the update data from the auxiliary updating device by the embedded electronic device through the serial transmission port to update the internal data of the embedded electronic device comprises:

transmitting a first response message to the auxiliary updating device by the processing circuit through the serial transmission port;

transmitting the update data to the processing circuit by the auxiliary updating device through the serial transmission port to respond to the first response message;

transmitting a second response message to the auxiliary updating device by the processing circuit through the serial transmission port after the processing circuit obtains the update data;

transmitting an update request to the processing circuit by the auxiliary updating device through the serial transmission port to respond to the second response message; and updating the internal data of the embedded electronic device with the update data by the processing circuit according to the update request.

\* \* \* \* \*